No. 799,494. PATENTED SEPT. 12, 1905.
V. PODUSCHKA.
CHECK DELIVERY APPARATUS.
APPLICATION FILED OCT. 17, 1904.
5 SHEETS—SHEET 5.
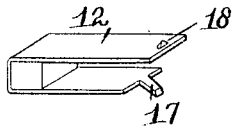
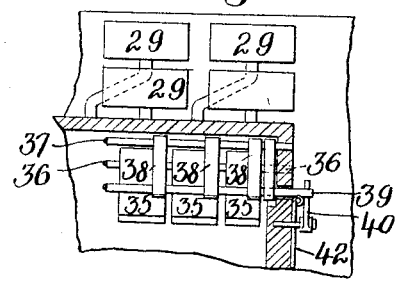
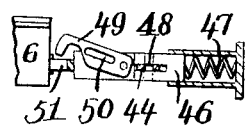
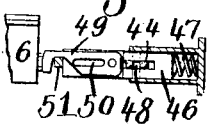
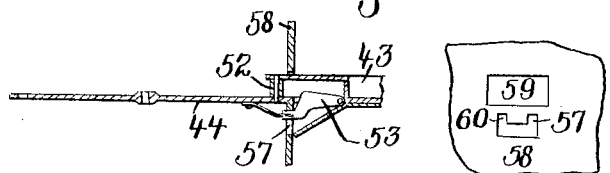
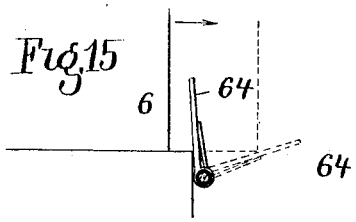
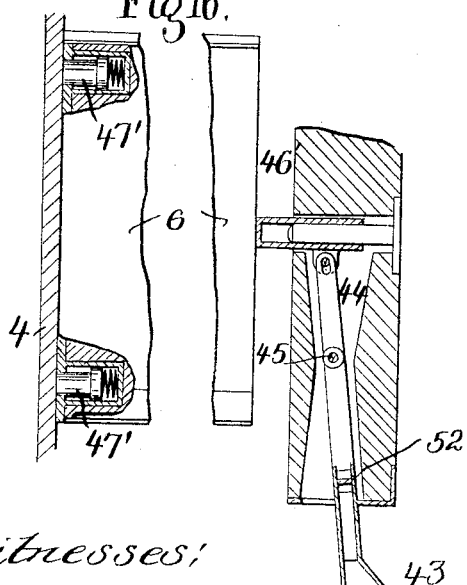
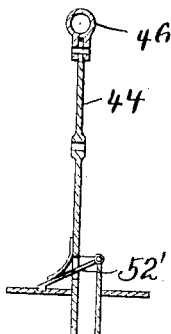
Witnesses:
James L. Norris, Jr.
C. D. Kesler
Inventor
Victor Poduschka
By James L. Norris
Atty.

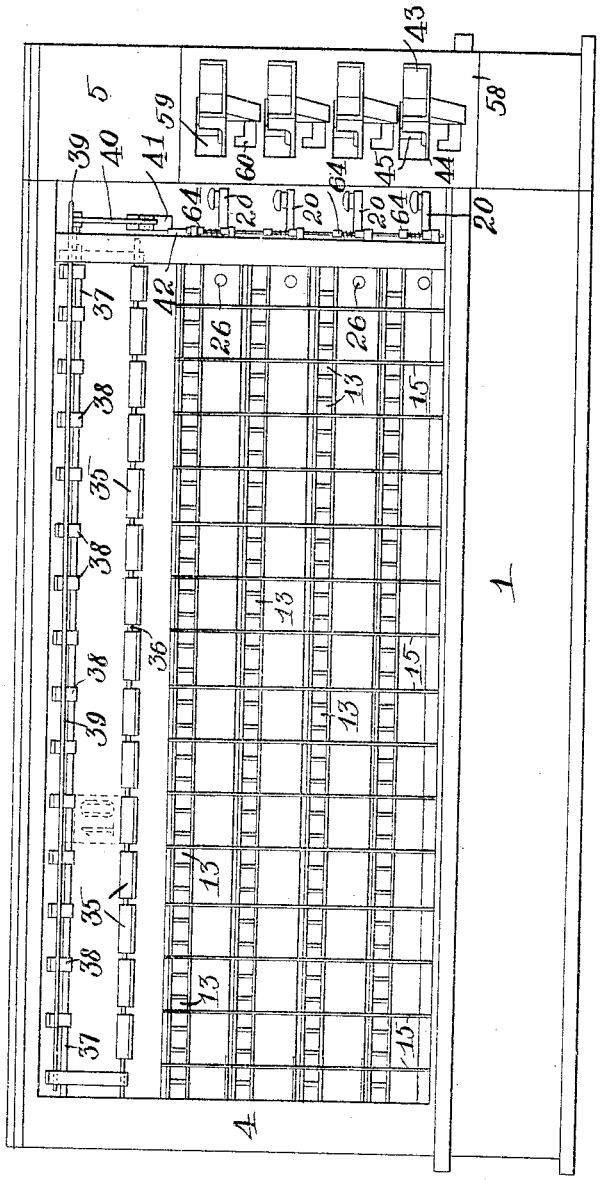

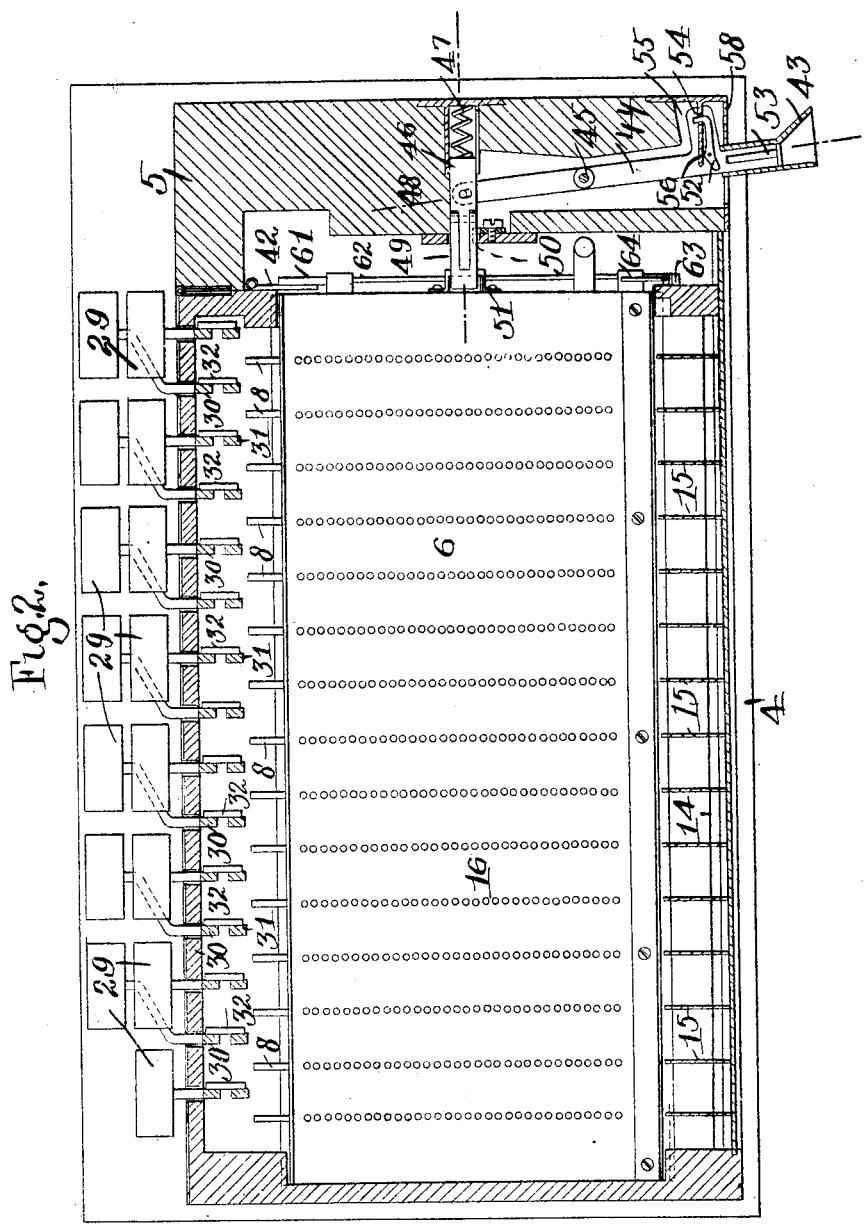

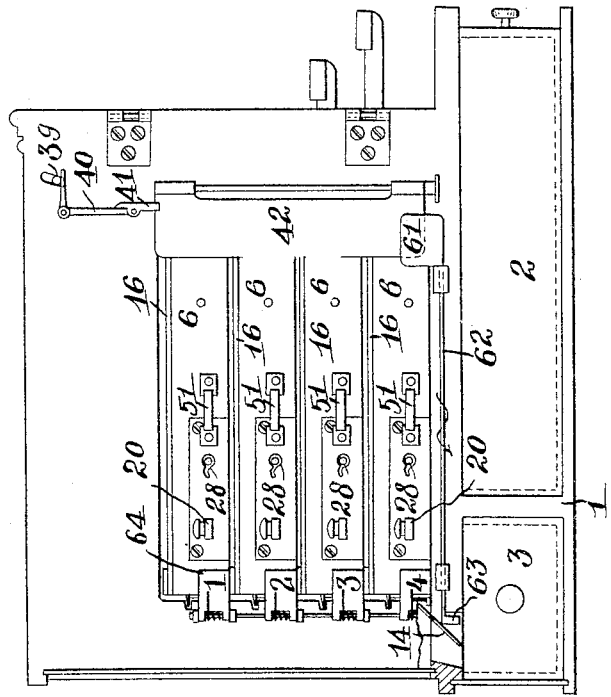

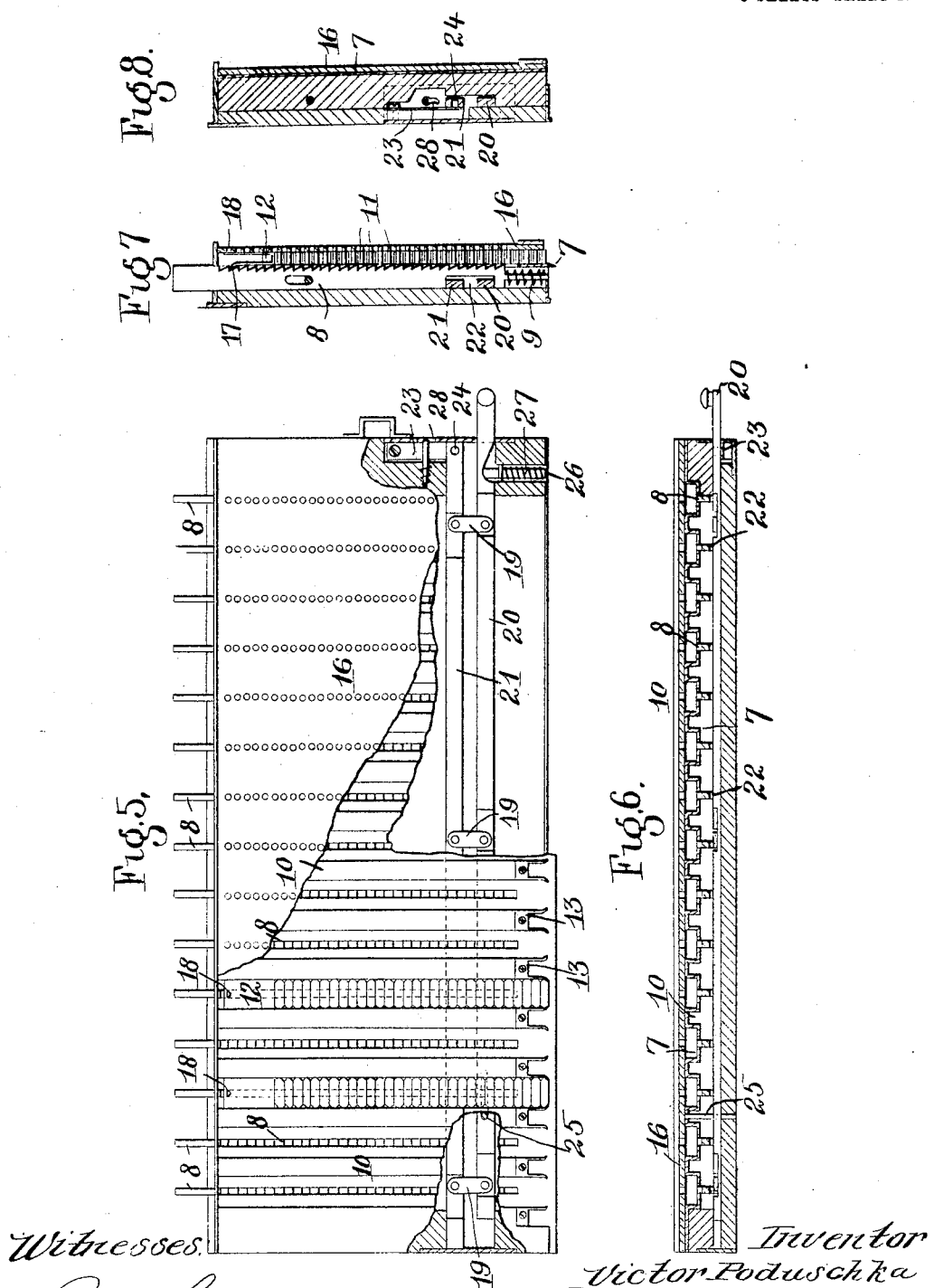

UNITED STATES PATENT OFFICE.

VIKTOR PODUSCHKA, OF VIENNA, AUSTRIA-HUNGARY.

CHECK-DELIVERY APPARATUS.

No. 799,494. Specification of Letters Patent. Patented Sept. 12, 1905.

Application filed October 17, 1904. Serial No. 228,812.

*To all whom it may concern:*

Be it known that I, VIKTOR PODUSCHKA, a subject of the Emperor of Austria-Hungary, residing at Vienna, in the Empire of Austria-Hungary, have invented certain new and useful Improvements in Check-Delivery Apparatus, of which the following is a specification.

In business establishments—such as restaurants, coffee-shops, and the like—it has been customary until now to control the cash received from the customers by entrusting the same to a head attendant or waiter, who is charged with the amount and is responsible to the owner of the establishment for all articles of consumption which are delivered or sold. In the case of larger establishments, in which it would be impossible to entrust the superintendence to one single head attendant or waiter, the establishment is subdivided into a number of sections, each section being in the charge of a separate head attendant or waiter. For checking the cash received by the head attendant or waiter a single cash-desk is employed in charge of a cashier. The head attendant or waiter receives every day a number of check-tokens, representing a certain amount of money, and upon having received from the customer an order for some article of consumption (food-stuff, drinks, &c.) the head attendant or waiter deposits at the cashier's desk one or several of the check-tokens which will correspond to the price of the article ordered, whereupon the cashier gives the necessary order to the department where the articles are kept or prepared (kitchen, storeroom, &c.) to deliver the article to the head attendant or waiter and at the same time notes on a reckoning-sheet the amount of the article ordered. At the close of the day the head waiter or attendant has to deliver to the cashier the total amount of the cash received, which, together with the amount of the remaining check-tokens possessed by the head attendant or waiter should represent the value of the check-tokens received by the head attendant or waiter at the commencement of the day. As a matter of course the amount of the cash received by the head attendant or waiter should also coincide with the aggregate amount of the cost of the items noted down by the cashier on the reckoning-sheet. In cases where the establishment is divided into several sections, each section in the charge of a head attendant or waiter, the reckoning-sheet is provided with several columns, each column corresponding to a separate section or head attendant or waiter, so that the sum total of each column indicates the amount of cash received by each head attendant and the aggregate sum of all columns gives the total amount of cash received during the day. This system of controlling the cash received is open to several important drawbacks, one of the principal of which consists in that from the check-tokens and the reckoning-sheet it is impossible to determine to what extent any particular article of consumption has been sold on a given day. Besides, any error made by the head attendant or waiter in the delivery of the check-tokens or by the cashier in noting down the items on the reckoning-sheet cannot be verified and corrected subsequently. Furthermore, neither the head attendant nor the cashier has the least possibility of controlling and verifying each other's proceedings.

According to the present invention all the above-mentioned drawbacks are entirely obviated, the check-tokens of the attendant and the reckoning-sheets of the cashier are done away with, and the registering of each article consumed is effected under the mutual control and supervision of both the head attendant or waiter and the cashier in a faultless and accurate manner, provision being also made for obtaining reckoning-sheets in which all entries are made by mechanical means automatically and which at the end of the day gives a clear account of the consumption of the various articles and the cash received.

For obtaining the foregoing objects the invention aims to provide a check-delivery apparatus which is adapted to be used simultaneously for a number of business sections, each in the charge of a head attendant or waiter, and each affords to the attendant or waiter assigned thereto and to the cashier the possibility of mutually checking each other. The apparatus is provided with a combined check storage and ejecting mechanism for each section, said mechanism before being operated adapted to be adjusted into operative relation with respect to an operating mechanism therefor. Said operating mechanism is adapted to be actuated on the combined check storage and ejecting mechanism only by the cashier with the consent of the head attendant or waiter, said storage and ejecting mechanism being adjusted by the attendant in charge thereof and said storage and ejecting mechanism serving to indicate the food-stuff, drink, or the like supplied as well as delivering the necessary check-tokens.

In the accompanying drawings a check-delivery apparatus in accordance with this invention is illustrated for use in connection with an establishment divided into four sections.

In the drawings, Figure 1 is a front elevation. Fig. 2 is a horizontal section. Fig. 3 is a vertical cross-section; Fig. 4, an end elevation with the closure means for the casing of the apparatus removed. Figs. 5, 6, 7, and 8 illustrate in plan a combined check storage and ejecting mechanism, the cover-plate being partially removed and in longitudinal and cross section, respectively. Figs. 9, 10, 11, 12, 13, 14, and 15 are detail views of various portions of the apparatus, and Figs. 16 and 17 show modified forms of the device for the adjustment of the combined check storage and ejecting mechanism.

The apparatus consists of a support 1, provided with two drawers (indicated by the reference characters 2 and 3) and displaceable at right angles with respect to each other. The drawers 2 and 3 are adapted to be locked; but the drawer 3 is displaceable parallel with the front side of the support and serves for the reception of the checks delivered by the cashier. Upon the support 1 is fixed a casing 4, glazed at its front and back and having one of its sides 5 forming a hinged door, which is adapted to be locked. The door 5 when open permits of the mounting of the combined check-storage and cash-ejecting mechanisms in any suitable manner. As shown, these mechanisms are superposed. The combined check storage and ejecting mechanisms are arranged in groups. Preferably the groups are superposed, although any other arrangement of the groups may be employed. Each group corresponds to a section or department of the establishment where the apparatus is used. Each group consists of a series of combined check storage and ejecting mechanisms. Each mechanism of each group is for a different article. For example, it will be assumed that each group comprises five combined check storage and ejecting mechanisms. One of these mechanisms will be for beer, another for whisky, another for coffee, another for a vegetable, and the other for a certain kind of meat. These mechanisms are generally referred to by the reference characters 6.

Each group of the combined check storage and ejecting mechanisms (best illustrated in Figs. 5, 6, 7, and 8) consists of a check-supporting plate 7, provided with a series of slots arranged in parallelism with respect to each other, and through the said slots are adapted to project toothed actuating-rods 8, which are displaceable and returned to their initial positions through the medium of the extensible springs 9, arranged at and engaging one end of the rods 8. Between every pair of the parallel slots in the check-supporting plate 7 are formed inverted-U-shaped projections 10, which form channels as well as guides for the check-tokens 11. One end of the projections 10 carries spring-clips 13 for retaining the checks from displacement until the checks are discharged through the medium of the ejecting devices 12, which are arranged in the channels formed by the projections 10. Each of the ejectors 12 is in the form of a substantially U-shaped spring-slide the lower arm of which carries a depending nose 17 and the upper arm of which carries an upwardly-extending stud 18. The function of the nose 17 and stud 18 will be hereinafter referred to. The spring-clips 13 are located over the drawer 3, the top of the support 1 being provided with an opening, so that when the checks are discharged they will fall through said opening into the drawer 3. A closure 14 is provided for the opening in the support 1. The casing 4 at the discharge end of the check storage and ejecting mechanisms is formed with a chamber into which the checks are ejected and from there fall into the drawer 3. This chamber is visible through the glazing of the front of the box and is divided by vertical strips of glass 15 into as many compartments as the number of check storage and ejecting mechanisms in each group. The channels formed by the projections 10 and which contain the checks and ejectors 12 are covered by a removable plate 16, which above each slot of the check-supporting plate 7 is provided with a series of openings, the interval between the openings being such that the nose of the ejector 12 will engage in the teeth of its respective actuating-rod 8 and the stud 18 of the ejector 12 will enter an opening in the plate 16, so that when the rod 8 is actuated the ejector 12 is advanced one tooth upon each operation of the rod 8. Between the rows of openings in the plate 16 there is indicated the portions of each food-stuff, drink, or the like in arithmetical order and the corresponding prices, so that when the group of the combined check storage and ejecting mechanisms is withdrawn it may at once be seen from the position of the stud 18, which is readily visible through the opening, how many portions of any particular food-stuff, drink, or the like have been supplied and what the total prices for them are.

The toothed actuating-rods 8 are prevented from displacement through the medium of a locking device, which can only be released by the attendant by a key. This locking device, Fig. 5, consists of two blades 20 and 21, parallel one with the other and connected by links 19. The blades 20 and 21 extend throughout the whole width of the group of combined check storage and ejecting mechanisms and lie in recesses 22, formed on the under side of the actuating-rods 8. One of these blades is displaceable relatively to the other by the distance between the centers of rotation of a link. Normally both blades are separated one from the other to such an extent that the distance between their outer edges is equal to the width of one of the recesses in the rods 8, so that these latter are locked. Such locking is produced by a stud 24, mounted on a spring 23, Figs. 5 and 8, and which falls into an opening in one of the blades. When this latter blade is moved away from the other blade, it is held in position by a pin-and-slot connection 25. The pin-and-slot connection 25 holds the blade 20 in the direction of its movement and also limits the movement thereof. A locking-pin 27 passes laterally through the frame, Fig. 5, and is moved into a recess in the blade 20 by a spring 27, so that when the toothed rods 8 are locked it permits of the arrangement of the combined check storage and ejecting mechanisms in corresponding guides in the casing. By the insertion of a key belonging to the attendant into the keyhole 28, formed in the check storage and ejecting mechanism, the stud 24 may be lifted out of the opening in the blade and the blade 21 released. Said blade 21 can then be displaced, thereby bringing the blades together and releasing the rods 8. Simultaneously by means of the blade 20 the locking-pin 26 is compressed out and brought into engagement with the guide in the casing. The check storage and ejecting mechanism or group of mechanisms are therefore held in this latter position and cannot be drawn out as long as the rods 8 are released. The locking-pin 26 projects into a longitudinal recess in the guide, so that a short displacement of the check storage and ejecting mechanism or group of mechanisms in the guide is possible.

The actuation of the rods 8 may take place after the entire check storage and ejecting mechanism is inserted in the casing, but only with a definite position of the mechanism or group of mechanisms, which position must be produced before each registration or check-delivery to be effected by the cashier, by the attendant who brings the rod or rods of his check storage and ejecting mechanism or group of mechanisms in operative relation with respect to a key-operating mechanism common to all the groups of check storage and ejecting mechanisms. The key-operating mechanism consists of the key-levers 29, Fig. 2, provided with suitable inscriptions, which levers engage with vertically-displaceable blades 30, which, by means of links 32 by their downward displacement produced by depressing the keys, each displace a second blade 31, provided with rollers 33 and guided on plates 34, against the rear ends of the rails projecting from the number-board in its, for the time being, appropriate position, and thereby displace these rails to such an extent that the slides each eject a check out of the guide-channels in the forward direction. When the blades 30 move downward, their upper end seizes an indicator-tab 35, corresponding to the sale, Fig. 3, and rotates the same around its axis 36 upward into the upright position shown in Figs. 1 and 3, so that through the glass dome of the casing and the transparent front wall of the same the check-number is visible to the attendant. The tabs 35 are held in the elevated position by a nose 38, capable of oscillation around a rotatable rod 37, and this nose is itself held by a wire 39, parallel with and connected to this rod 37, so as to be capable of swinging. For the purpose of releasing the tabs 35 this wire 39 may be lifted by means of a bent lever 40, Figs. 1, 4, and 10, which upon its downwardly-directed arm carries a knuckle-jointed tappet 41, capable of rocking in one direction. This tappet may be seized by a wing 42, extending over the entire height of all the groups of combined check storage and ejecting mechanism and adapted to be swung against the door 5 by the displacement of any one of them. By this means the bent lever 40 is tripped, so that the tab 35, which was being held up, descends. By this means an incorrect or unintentional delivery of checks from the channels by the cashier is rendered impossible, and, on the other hand, the keys, the number of which is equal to the number of the actuating-rods 8 of the combined check storage and ejecting mechanism, may be used for any number of combined check storage and ejecting mechanisms. Each of these latter is first brought into the correct position within the closed casing for the key depression—that is to say, in such a position that the actuating-rods of one group of check storage and ejecting mechanisms come exactly in front of the blades 31, operated by the key-pressure. Normally when the door 5 is closed the rails are displaced relatively to these blades, and the group of check storage and ejecting mechanisms must be moved slightly relatively to the door of the casing in order to attain this agreement. This displacement can only be effected by the proper attendant, who is provided with a special key, which he must insert immediately before the operation of the mechanism for ejecting the checks into a key-tube 43, projecting from the door 5. Each of these key-tubes forms, as shown in Figs. 2, 11, and 12, a part of a two-armed lever 44, which is rotatable round the shaft 45 and is articulated to the inner end of a piston 46, which is submitted to the pressure of a spring 47 and carries a pawl 49, rotatable around the horizontal spindle 48. This pawl is rotated in the vertical plane upon the displacement of the piston by means of a pin-and-slot device 50. By this means the pawl is caused to engage with or disengage from an eye 51, arranged on the number-board. In the first case the group of check storage and ejecting mechanisms is displaced and its rails are set in front of the blades 31, while in the latter case the group of check storage and ejecting mechanisms is pressed back by the piston 46, owing to the action of the spring 47, whereby the rails are brought out of reach of the blade 31. Each lever 44, together with its key-tube 43, is normally held in that position in which the pawl is lifted out of the eye within the door 5 by two pawls 52 and 53, Figs. 2 and 13. One of these pawls, which is released by the front extremity of the bit of the key, engages in a perforation 54 of a wall 56, arranged in the recess 55 of the door, while the second pawl 53, which, like the first, is submitted to spring-pressure, engages in a recess 57 of the door-cover plate 58. This latter is provided with a slot 59 for the key-tube passing through it, and this slot is of such a width that the lever movement may be carried out. By the insertion of the key and the release of both the pawls 52 and 53, which is thereby effected, the lever 44 may be rocked by pressing sidewise with the hand holding the key. By this means the piston is drawn into the door with compression of the spring 47, the pawl 49 is introduced into the eye 51 of the group of check storage and ejecting mechanisms, and this latter pressed forward by the piston. The locking-pawl 53 at the end of the rocking of the lever comes under a second recess 60 of the door-plate 58, into which it springs if the key has been withdrawn previously and holds the key-tube, together with the group of check storage and ejecting mechanisms, in the new position. If, however, the key remains inserted after it has been released, the lever 44 is turned back by the piston-spring 47, which becomes operative, the pawl is lifted out of the eye, and the group of check storage and ejecting mechanisms returned to its initial position by the piston.

The device for adjusting the group of check storage and ejecting mechanisms may also consist of the arrangement shown in Figs. 16 and 17. In this case the lever 44 operates a hollow plunger 46', displaceable upon a slide and pressing directly upon the group of check storage and ejecting mechanisms, which upon its opposite side is provided with spring-buffers 47', which upon the release of the pawl 52', retaining the lever 44, produce the adjustment of the group of check storage and ejecting mechanisms by the intermediary of the inserted key. In this arrangement the keys may be withdrawn after the release of the pawl and the lever is returned to its initial position by hand.

In setting the group of check storage and ejecting mechanisms in the position appropriate for operating the rails by the keys the wing 42 is simultaneously rocked. By the displacement of this wing a tablet 35, previously raised, is caused to descend, and, further, a lug 61, which is mounted on one end of a rock-shaft 62, is set over into a horizontal position. The shaft 62, which is thereby rotated, lifts, by means of a finger 63 fixed upon its other extremity, the hinged bottom 14, Fig. 4, which is situated in an inclined position, this bottom closing the drawer 3 at the top and during the operation of the rails of the adjusted number-board receives the ejected checks. In this manner, as the checks lie upon the horizontally-arranged bottom 14 and remain visible, the attendant is able to exercise a further control as to the correctness of the registration which has taken place. When the group of check storage and ejecting mechanisms returns to its initial position, the wing 42 rocks against the same and the released bottom falls downward, so that the checks fall into the drawer 3.

On the rear wall of the space divided into compartments into which the checks are ejected there are also arranged rotatable spring-controlled tables 64, with checking-figures for the group of check storage and ejecting mechanisms which tables on the adjustment of the group of check storage and ejecting mechanisms are also rotated and show to the attendant during the period of registering that the proper groups of check storage and ejecting mechanisms have been operated.

I claim—

1. An apparatus of the character described, comprising the combination with a combined check storage and ejecting mechanism, of operating means therefor, said means consisting of a pair of vertically-disposed bars, one arranged in parallelism with and slightly in advance of the other and one of which is actuated in one direction by the other, causing thereby the operation of said mechanism and the discharging of a check therefrom.

2. An apparatus of the character described, comprising the combination with a combined check storage and ejecting mechanism, of operating means therefor, said means consisting of a pair of vertically-disposed bars, one arranged in parallelism with and slightly in advance of the other and one of which is actuated in one direction by the other, causing thereby the operation of said mechanism and the discharging of a check therefrom, said actuated bar adapted to be automatically returned to its normal position by said mechanism.

3. An apparatus of the character described, comprising the combination with a combined check storage and ejecting mechanism, of operating means therefor, said means consisting of a pair of vertically-disposed bars permanently connected together, one of said bars arranged in parallelism with and slightly in advance of the other and one of which is actuated in one direction by the other, causing thereby the operation of said mechanism and the discharging of a check.

4. An apparatus of the character described, comprising the combination with a combined check storage and ejecting mechanism, of operating means therefor, said means consisting of a pair of vertically-disposed bars permanently connected together, one of said bars arranged in parallelism with and slightly in advance of the other and one of which is actuated in one direction by the other, causing thereby the operation of said mechanism and the discharging of a check, said actuated bar adapted to be automatically returned to its normal position by said mechanism.

5. An apparatus of the character described, comprising the combination with a combined check storage and ejecting mechanism, of operating means therefor, said means consisting of a pair of vertically-disposed bars, one arranged in parallelism with and slightly in advance of the other and one of which is actuated in one direction by the other, causing thereby the operation of said mechanism and the discharging of a check, and permanent pivotal connections between said bars, said actuated bar adapted to be automatically returned to its normal position by said mechanism.

6. An apparatus of the character described, comprising the combination with a combined check storage and ejecting mechanism, of a pair of vertically-disposed bars for operating said mechanism, one of said bars arranged in parallelism with and slightly in advance of the other of said bars and one of said bars actuated by the other, said actuated bar automatically returned to its normal position by said mechanism, and an indicating means adapted to be moved to exposure position by one of said members.

7. An apparatus of the character described, comprising the combination with a combined check storage and ejecting mechanism, of a pair of vertically-disposed bars for operating said mechanism, one of said bars arranged in parallelism with and slightly in advance of the other and one of said bars actuated by the other, said actuated bar automatically returned to its normal position by said mechanism, an indicating means adapted to be moved to exposure position by one of said members, and means for returning said indicating means to normal position.

8. A machine of the character described, comprising a casing, and a transversely-shiftable combined check storage and ejecting mechanism arranged within the casing, shiftable independently of the casing and having as a permanent part thereof means for indicating the value of the checks ejected.

9. An apparatus of the character described, comprising a group of transversely and bodily shiftable combined check storage and ejecting mechanisms, operating devices for said mechanisms, and means for transversely and bodily shifting said mechanisms, causing one of said mechanisms to be positioned in the path of one of the operating devices and then be operated by said device and a check ejected therefrom.

10. A machine of the character described comprising a casing, a group of transversely and bodily shiftable combined check storage and ejecting mechanisms arranged within the casing, said mechanisms transversely shiftable independently of the casing and each of said mechanisms having as a permanent part thereof, means for automatically indicating the value of checks ejected.

11. A machine of the character described, comprising a casing, a transversely-shiftable and a normally locked combined check storage and ejecting mechanism arranged within the casing and independently shiftable of the casing, and means for unlocking said mechanism to permit of the transverse shifting thereof.

12. A machine of the character described, comprising a casing, transversely-shiftable and normally locked combined check storage and ejecting mechanisms arranged within and shiftable independently of the casing, means for unlocking said mechanism to permit of the transverse shifting thereof, and means for operating said mechanism.

13. A machine of the character described, comprising a shiftable and normally locked combined check storage and ejecting mechanism, means for unlocking said mechanism to permit of the shifting thereof, means for operating said mechanism, and a locking device to prevent the operation of said ejecting mechanism, said locking device being independent of the first-mentioned locking device.

14. A machine of the character described, comprising a casing, a plurality of superposed groups of transversely and bodily shiftable combined check storage and ejecting mechanisms arranged within the casing and shiftable independently of the casing, means for transversely shifting one of said groups independently of the other, and means for ejecting checks from said mechanisms of each group.

15. A machine of the character described, comprising a casing, a plurality of superposed groups of bodily-shiftable combined check storage and ejecting mechanisms arranged within and independently shiftable of the casing, means for shifting one of said groups independently of the other while the latter remains stationary, and operating devices for the mechanisms of the shifted group.

16. A machine of the character described, comprising a casing, a plurality of groups of bodily-shiftable combined check storage and ejecting mechanisms arranged within and shiftable independently of the casing, means for shifting one of said groups independently of the other while the latter remains stationary, and means for ejecting checks from the mechanisms of said shifted group.

17. A machine of the character described, comprising a casing, a group of bodily-shiftable combined check storage and ejecting mechanisms arranged within and shiftable independently of the casing, means for shifting one of said groups independently of the other and while the latter remains stationary, and operating devices for the mechanisms of said shifted group.

18. A machine of the character described, comprising a plurality of superposed groups of bodily-shiftable combined check storage and ejecting mechanisms, key-released mechanisms for shifting one of said groups independently of the other, and means for ejecting checks from the mechanisms of the shifted group.

19. A machine of the character described, comprising a plurality of superposed groups of bodily-shiftable combined check storage and ejecting mechanisms, key-released mechanisms to permit of the shifting of one of said groups independently of the other, and selective operating devices for the mechanisms of said shifted group.

20. A machine of the character described, comprising a plurality of groups of bodily-shiftable combined check storage and ejecting mechanisms, key-released mechanisms to permit of the shifting of one of said groups independently of the other, and means for ejecting checks from the mechanisms of the shifted group.

21. A machine of the character described, comprising a plurality of groups of bodily-shiftable combined check storage and ejecting mechanisms, key-released mechanisms to permit of the shifting of one of said groups independently of the other, and selective operating devices for the mechanisms of said shifted group.

22. A machine of the character described, comprising a shiftable and normally locked combined check storage and ejecting mechanisms, a key-released means for unlocking said mechanisms to permit of the shifting thereof, and means for operating said mechanisms.

23. A check-delivery apparatus having as a part thereof, an ejector-slide consisting of a pair of spring-arms connected together at one end, one of said arms at its free end provided with an upwardly-extending stud and the other of said arms having a depending projection.

24. A check-delivery apparatus having as a part thereof, an ejector-slide consisting of a pair of superposed spring-arms connected together at one end, the upper of said arms provided with an upwardly-extending stud and the lower of said arms having a depending projection.

25. A check-delivery apparatus having a combined check storage and ejecting mechanism, said mechanism comprising a check-supporting plate provided with a channel for the checks and further provided with a slot, spring-clips carried by said plate for retaining the checks in the channel at one end thereof, a toothed actuating-rod extending through said slot, a closure-plate for the channel provided with a row of openings, and an ejector-slide provided with a stud adapted to engage in the openings and further provided with a depending projection adapted to engage the teeth of the rod.

26. A check-delivery apparatus having a combined check storage and ejecting mechanism, said mechanism comprising a check-supporting plate provided with a channel for the checks and further provided with a slot, spring-clips carried by said plate for retaining the checks in the channel at one end thereof, a toothed actuating-rod extending through said slot, a closure-plate for the channel provided with a row of openings, an ejector-slide provided with a stud adapted to engage in the openings and further provided with a depending projection adapted to engage the teeth of the rod, and a spring for automatically returning the rod to its initial position after being actuated.

27. A check-delivery apparatus having a combined check storage and ejecting mechanism, said mechanism comprising a check-supporting plate provided with a channel for the checks and further provided with a slot, spring-clips carried by said plate for retaining the checks in the channel at one end thereof, a toothed actuating-rod extending through said slot, a closure-plate for the channel provided with a row of openings, and an ejector-slide provided with a stud adapted to engage in the openings and further provided with a depending projection adapted to engage the teeth of the rod, combined with a key-released means for locking the rod to prevent operation of said mechanism.

28. A check-delivery apparatus having a combined check storage and ejecting mechanism, said mechanism comprising a check-supporting plate provided with a channel for the checks and further provided with a slot, spring-clips carried by said plate for retaining the checks in the channel at one end thereof, a toothed actuating-rod extending through said slot, a closure-plate for the channel provided with a row of openings, an ejector-slide provided with a stud adapted to engage in the openings and further provided with a depending projection adapted to engage the teeth of the rod, combined with a key-released means for locking the rod to prevent operation of said mechanism.

29. A check-delivery apparatus having as a part thereof, a plurality of combined check storage and ejecting mechanisms, said mechanisms comprising a check-supporting plate provided with parallel slots and further provided with projections forming channels for the checks, spring-clips carried by the projections at one end thereof for retaining the checks in the channels, toothed actuating-rods extending through said slots, a closure-plate for the channels provided with rows of openings arranged in vertical alinement with said slots, and ejector-slides mounted in said channels and provided with studs adapted to engage in the said openings and further provided with depending projections adapted to engage the teeth of the rods.

30. A check-delivery apparatus having as a part thereof a plurality of combined check storage and ejecting mechanisms, said mechanisms comprising a check-supporting plate provided with parallel slots and further provided with projections forming channels for the checks, spring-clips carried by the projections at one end thereof for retaining the checks in the channels, toothed actuating-rods extending through said slots, a closure-plate for the channels provided with rows of openings arranged in vertical alinement with said slots, ejector-slides mounted in said channels and provided with studs adapted to engage in the said openings and further provided with depending projections adapted to engage the teeth of the rods, and springs for returning the rods to their initial position after being operated.

31. A check-delivery apparatus having as a part thereof a plurality of combined check storage and ejecting mechanisms, said mechanisms comprising a check-supporting plate provided with parallel slots and further provided with projections forming channels for the checks, spring-clips carried by the projections at one end thereof for retaining the checks in the channels, toothed actuating-rods extending through said slots, a closure-plate for the channels provided with rows of openings arranged in vertical alinement with said slots, and ejector-slides mounted in said channels and provided with studs adapted to engage in the said openings and further provided with depending projections adapted to engage the teeth of the rods, combined with a key-released means for locking the rods to prevent the operation of the said mechanisms.

32. A check-delivery apparatus having as a part thereof a plurality of combined check storage and ejecting mechanisms, said mechanisms comprising a check-supporting plate provided with parallel slots and further provided with projections forming channels for the checks, spring-clips carried by the projections at one end thereof for retaining the checks in the channels, toothed actuating-rods extending through said slots, a closure-plate for the channels provided with rows of openings arranged in vertical alinement with said slots, ejector-slides mounted in said channels and provided with studs adapted to engage in the said openings and further provided with depending projections adapted to engage the teeth of the rods, and springs for returning the rods to their initial position after being operated, combined with key-released means for locking the rods to prevent the operation of the said mechanisms.

33. A check-delivery apparatus having a combined check storage and ejecting mechanism, said mechanism comprising a check-supporting plate provided with a channel for the checks and further provided with a slot, spring-clips carried by said plate for retaining the checks in the channel at one end thereof, a toothed actuating-rod extending through said slot, a closure-plate for the channel provided with a row of openings, an ejector-slide provided with a stud adapted to engage in the openings and further provided with a depending projection adapted to engage the teeth of the rod, and means for actuating said rod, causing thereby the operation of the slide and the ejecting of the checks.

34. A check-delivery apparatus having a combined check storage and ejecting mechanism, said mechanism comprising a check-supporting plate provided with channels for the checks and further provided with a slot, spring-clips carried by said plate for retaining the checks in the channels at one end thereof, a toothed actuating-rod extending through said slot, a closure-plate for the channel provided with a row of openings, an ejector-slide provided with a stud adapted to engage in the openings and further provided with a depending projection adapted to engage the teeth of the rod, a spring for automatically returning the rod to its initial position after being actuated, and means for actuating said rod, causing thereby the operation of the slide and the ejecting of the checks.

35. A check-delivery apparatus having a combined check storage and ejecting mechanism, said mechanism comprising a check-supporting plate provided with a channel for the checks and further provided with a slot, spring-clips carried by said plate for retaining the checks in the channel at one end thereof, a toothed actuating-rod extending through said slot, a closure-plate for the channel provided with a row of openings, and an ejector-slide provided with a stud adapted to engage in the openings and further provided with a depending projection adapted to engage the teeth of the rod, combined with a key-released means for locking the rod to prevent operation of said mechanism, and means for actuating said rod, causing thereby the operation of the slide and the ejecting of the checks.

36. A check-delivery apparatus having a combined check storage and ejecting mechanism, said mechanism comprising a check-supporting plate provided with a channel for the checks and further provided with a slot, spring-clips carried by said plate for retaining the checks in the channel at one end thereof, a toothed actuating-rod extending through said slot, a closure-plate for the channel provided with a row of openings, an ejector-slide provided with a stud adapted to engage in the openings and further provided with a depending projection adapted to engage the teeth of the rod, combined with a key-released means for locking the rod to prevent operation of said mechanism, and means for actuating said rod, causing thereby the operation of the slide and the ejecting of the checks.

37. A check-delivery apparatus having as a part thereof, a plurality of combined check storage and ejecting mechanisms, said mechanisms comprising a check-supporting plate provided with parallel slots and further provided with projections forming channels for the checks, spring-clips carried by the projections at one end thereof for retaining the checks in the channels, toothed actuating-rods extending through said slots, a closure-plate for the channels provided with rows of openings arranged in vertical alinement with said slots, ejector-slides mounted in said channels and provided with studs adapted to engage in the said openings and further provided with depending projections adapted to engage the teeth of the rods, and operating devices for the said rods.

38. A check-delivery apparatus having as a part thereof a plurality of combined check storage and ejecting mechanisms, said mechanisms comprising a check-supporting plate provided with parallel slots and further provided with projections forming channels for the checks, spring-clips carried by the projections at one end thereof for retaining the checks in the channels, toothed actuating-rods extending through said slots, a closure-plate for the channels provided with rows of openings arranged in vertical alinement with said slots, ejector-slides mounted in said channels and provided with studs adapted to engage in the said openings and further provided with depending projections adapted to engage the teeth of the rods, springs for returning the rods to their initial positions after being operated, and operating devices for the said rods.

39. A check-delivery apparatus having as a part thereof a plurality of combined check storage and ejecting mechanisms, said mechanisms comprising a check-supporting plate provided with parallel slots and further provided with projections forming channels for the checks, spring-clips carried by the projections at one end thereof for retaining the checks in the channels, toothed actuating-rods extending through said slots, a closure-plate for the channels provided with rows of openings arranged in vertical alinement with said slots, and ejector-slides mounted in said channels and provided with studs adapted to engage in the said openings and further provided with depending projections adapted to engage the teeth of the rods, combined with a key-released means for locking the rods to prevent the operation of the said mechanisms, and operating devices for the said rods.

40. A check-delivery apparatus having as a part thereof a plurality of combined check storage and ejecting mechanisms, said mechanisms comprising a check-supporting plate provided with parallel slots and further provided with projections forming channels for the checks, spring-clips carried by the projections at one end thereof for retaining the checks in the channels, toothed actuating-rods extending through said slots, a closure-plate for the channels provided with rows of openings arranged in vertical alinement with said slots, ejector-slides mounted in said channels and provided with studs adapted to engage in the said openings and further provided with depending projections adapted to engage the teeth of the rods, and springs for returning the rods to their initial position after being operated, combined with key-released means for locking the rods to prevent the operation of the said mechanisms, and operating devices for the said rods.

41. In a check-delivery apparatus, the combination with a plurality of groups of bodily-shiftable combined check storage and ejecting mechanisms, and selective operating devices for said mechanisms, of an indicating mechanism for indicating the value of the check discharged, said indicating mechanism consisting of a plurality of indicator-tabs, means for retaining said tabs in an elevated position, a bar for holding said means in operative position, a trip-lever for releasing said bar, and a wing actuated by one of said groups for tripping said lever.

42. In a check-delivery apparatus, the combination with a plurality of groups of bodily-shiftable combined check storage and ejecting mechanisms, of means for rendering visible the check discharged, said means consisting of a movable bottom arranged in front of said groups, vertical partitions forming compartments corresponding in number to the number of mechanisms of each group, a rock-shaft, an arm carried thereby for operating said bottom, a finger 63 carried by said shaft, and a wing adapted to be actuated by the adjustment of one of said groups and adapted to engage the arm 63 for locking said shaft.

43. In a check-delivery apparatus, the combination with a combined check storage and ejecting mechanism, of means for locking said mechanism, said means consisting of a pair of displaceable transversely-extending blades, links connecting said blades, and a key-released means for retaining said blades in locking position.

44. In a check-delivery apparatus, the combination with a combined check storage and ejecting mechanism, of means for adjusting said mechanism, said means consisting of an oscillatory lever terminating in a key-tube, a spring-controlled piston acted upon by said lever, a connection between the piston and the said mechanism, and a pair of pawls for retaining said lever in operative position and adapted to be engaged and operated by a key for releasing the lever, causing thereby the release of the piston and the adjusting of the mechanism.

45. In a machine of the character described, means for rendering visible the check discharged, said means comprising the combination with a tilting support, of a rock-shaft, a finger carried on one end of said shaft and adapted to prevent the support from tilting, a lug carried on the other end of said shaft, and shiftable means adapted when operated in one direction to engage said lug, thereby rocking said shaft and moving the finger out of the path of the support to permit of the tilting thereof.

46. In a machine of the character described, means for rendering visible the check discharged, said means comprising the combination with a tilting support, of a rock-shaft, a finger carried on one end of said shaft and adapted to prevent the support from tilting, a lug carried on the other end of said shaft, and vertically-extending and shiftable means adapted when operated in one direction to engage said lug, thereby rocking said shaft and moving the finger out of the path of the support to permit of the tilting thereof.

47. In an apparatus of the character described, a casing, a group of combined check storage and ejecting mechanisms, said mechanisms arranged within said casing arranged in parallelism with respect to each other and said mechanisms bodily shiftable together independently of the casing, and means for selectively operating any one of the said mechanisms of said group.

48. In a machine of the character described, a casing, a plurality of groups of combined check storage and ejecting mechanisms arranged within said casing, the mechanisms of each group arranged in parallelism with respect to each other, each of said groups of mechanisms bodily movable together independently of the casing, and means for selectively operating any one of the mechanisms of each group of mechanisms.

49. In a machine of the character described, a casing, a plurality of superposed groups of combined check storage and ejecting mechanisms arranged within said casing, the mechanisms of each group arranged in parallelism with respect to each other, each of said groups of mechanisms bodily shiftable together independently of the casing, and means for selectively operating any one of the mechanisms of each group of mechanisms.

50. A machine of the character described, comprising a casing, a shiftable and normally locked combined check storage and ejecting mechanism arranged within and shiftable independently of the casing, means for releasing the said mechanism, means for shifting said mechanism, and means for operating said mechanism, causing thereby the discharge of checks therefrom.

51. A machine of the character described, comprising a casing, a group of bodily-shiftable and normally locked combined check storage and ejecting mechanisms arranged within and shiftable independently of the casing, means for unlocking said mechanisms to permit of the shifting thereof, means for shifting said group of mechanisms while the casing remains stationary, and means for operating one of said mechanisms, causing thereby the discharge of checks therefrom.

52. A check-delivery apparatus having a combined check storage and ejecting mechanism, said mechanism comprising a check-supporting plate and further provided with a slot, means carried by said plate for retaining the checks thereon, an actuating-rod extending through said slot, a closure-plate superposed upon said check-supporting plate and provided with openings, and an ejecting means for the checks adapted to engage in the rod and in the said openings.

In tesitmony whereof I have hereunto set my hand in presence of two subscribing witnesses.

VIKTOR PODUSCHKA.

Witnesses:
JOSEF RUBURCH,
ALVESTO S. HOGUE.